United States Patent [19]

Peterson, Jr.

[11] 4,086,775

[45] May 2, 1978

[54] METHOD AND APPARATUS FOR GENERATING POWER BY SEA WAVE ACTION

[76] Inventor: Charles A. Peterson, Jr., 365 Willow Ave., Scotch Plains, N.J. 07076

[21] Appl. No.: 785,242

[22] Filed: Apr. 6, 1977

[51] Int. Cl.² .............................................. E02B 9/08
[52] U.S. Cl. ........................................ 61/20; 60/398; 415/182
[58] Field of Search ................... 61/20, 19, 5; 60/398; 415/182

[56] References Cited

U.S. PATENT DOCUMENTS

| 1,147,082 | 7/1915 | Farra ........................................ 61/20 |
| 1,742,068 | 12/1929 | Grasset .................................... 61/20 |
| 2,044,686 | 6/1936 | Harrison et al. .......................... 61/20 |
| 3,391,903 | 7/1968 | Peterson, Jr. ......................... 61/20 X |
| 3,691,774 | 9/1972 | Hard ......................................... 61/5 |

Primary Examiner—Jacob Shapiro
Attorney, Agent, or Firm—Martha G. Pugh

[57] ABSTRACT

An improved method and system for generating power, more particularly, electrical power, from the wave motion of a large body of water. A central tower, closed at the top, which supports a substantial head of water above the mean water level of the large body of water, has at least one, and preferably a large number of, conduits connected between the top of the tower and a level between the high and mean liquid level of the body of water. Periodic wave motion washing over their lower ends builds up water pressure in the conduits, causing flow to the top of the tower, which causes a constant flow down through the tower. A turbine mounted in a Venturi constriction at an intermediate level in the tower is driven to rotate by the downward flow of water, causing a generator to produce electricity. In one embodiment, the primary tower is based on shore with an outlet to the sea. In another embodiment, the tower is supported on the sea floor, and is surrounded by a breakwater for minimizing wave action adjacent the tower.

14 Claims, 5 Drawing Figures

METHOD AND APPARATUS FOR GENERATING POWER BY SEA WAVE ACTION

BACKGROUND OF THE INVENTION

This relates in general to the generation of power, more particularly, electrical power, utilizing the wave action developed in a large body of water.

In the prior art, many techniques and systems have been devised for using the waves and tides to generate power inexpensively. Initially, purely mechanical means were used to harness water power flowing from a higher to a lower level to drive paddle wheels, turbines and the like. With the advent of electricity, these means were used to operate electrical generators. One of the major problems with water-driven generators of the prior art types described is that the wave motion is inconstant, resulting in an uneven flow which must be converted to a constant or uniform flow in order to provide a practical source of electricity.

In order to overcome these difficulties, I devised the method and system for generating power which is set forth in my U.S. Pat. No. 3,391,903, issued July 9, 1968, in which the siphon principle is utilized to provoke flow of water through a supply conduit into a tower closed at the top, and having its open lower end mounted below the mean level of the sea, or other large body of water, the supply conduit having its intake end mounted in a reservoir, the level of which is constantly replenished by wave motion. The mean water level in the reservoir is higher than the level of the sea in which the tower is placed. Accordingly, when the tower is initially charged with a head of water, a flow is initiated through the intake conduit into the top part of the tower, causing flow to continue down through the tower. In order to increase the velocity of downward flow in the tower, the latter is formed to include a Venturi constriction near its mid-section. A turbine is mounted in the constriction so that its vanes are intercepted by the falling water, causing it to rotate, driving a central shaft which operates an electrical generator.

One of the disadvantages of the system of my prior U.S. Pat. No. 3,391,903 is that it requires the construction of a supply reservoir which must be constantly replenished by wave or tidal action, or both. If liquid is not replenished in the supply reservoir to a plane above the mean liquid level of the body of water which supports the head of water in the tower, then no flow will take place in the conduit, and the system fails to operate.

SUMMARY OF THE INVENTION

In accordance with the improvements of the present invention, no separate reservoir is required to activate the system. Instead, the new system is activated by the difference in liquid pressure resulting from waves passing over each of a multiplicity of conduits, the lower ends of which extend below the mean liquid level in the body of water surrounding the tower, which is isolated from the wave motion.

In one embodiment, the tower is mounted on the shore. The tower has an outlet below the low water level of the main body of water. A plurality of intake conduits surround the tower on the sea side, leading from below the mean water level to the top of the tower.

In another embodiment, the tower is mounted on the sea bed so that its open lower end is below the low or mean water level. A plurality of intake conduits completely surround the tower, leading from below the mean water level to the top of the tower. The tower is isolated from wave motion by a breakwater, which may either take the form of a jetty, or a flotation collar having a depending skirt. In either case, a film of oil is spread between the jetty or the flotation collar and the tower to reduce the wave action to a minimum.

In both of the embodiments disclosed herein, wave action in periodic contact with the ends of each of the conduits causes a change in pressure from zero, at the mean liquid level and below, to a positive pressure, designated $X+$, when the wave reaches its crest. This causes a continuous flow of water up one or another of the multiplicity of conduits to the top of the tower as the waves flow over the grid formed by their exposed inlet ends. This adds to the head of water in the tower, and causes water to flow down through the tower, increasing its velocity at the Venturi constriction. The flowing water rotates a turbine which, as in the previously described system, drives an alternating current electrical generator.

The system of the present invention provides means for readily harnessing the waves, there being enough intake conduits to provide a substantial volume of water to the top of the tower, which, in turn, provides a substantial flow of water to drive the generator-coupled turbine. Moreover, because of the extensive grid of intake conduits, a single wave is intercepted over and over again, greatly increasing the efficiency of the system. The present invention provides a practical, dependable system, relatively simple and easy to construct, for generating electricity in a pollution-free manner without the use of fuel to drive the generator. These and other objects, features and advantages will be apparent to those skilled in the art from a study of the specification hereinafter with reference to the attached drawings.

DETAILED DESCRIPTION

Figure 1:
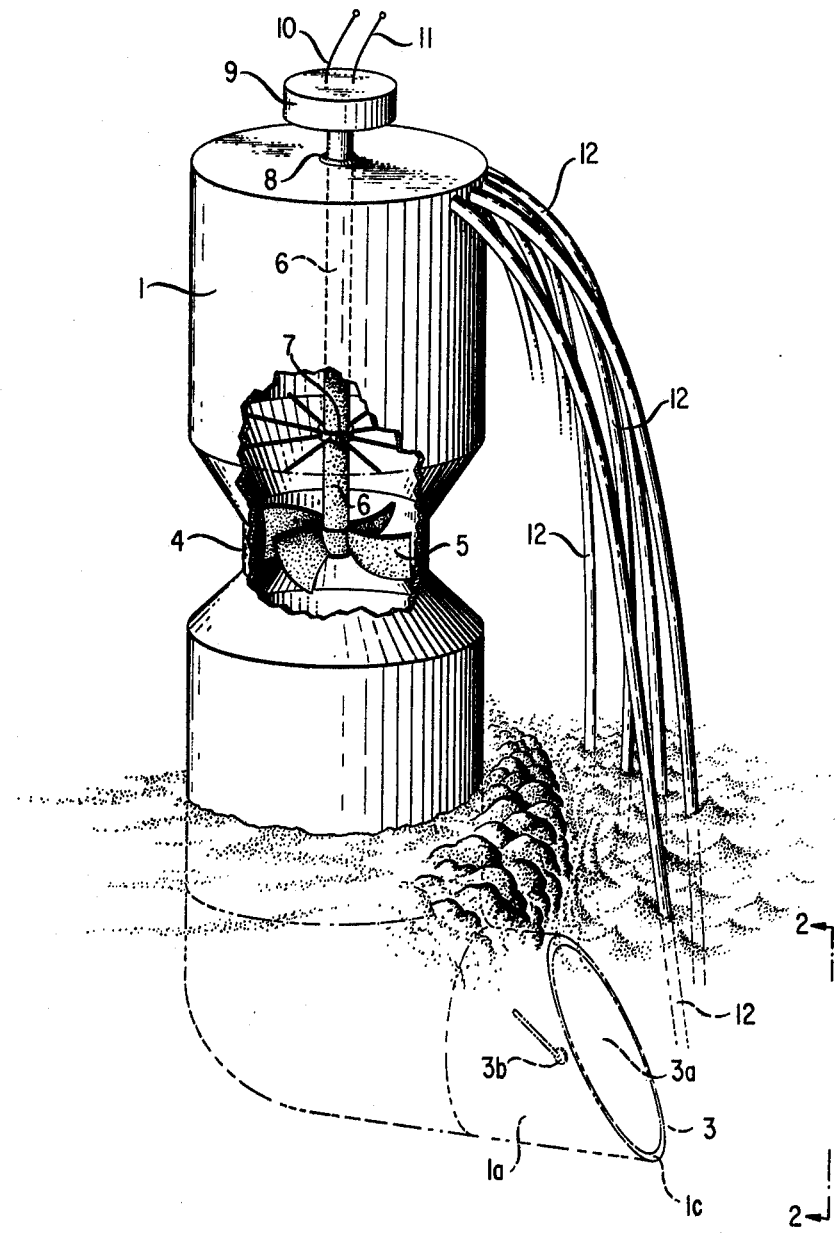
FIG. 1 is a perspective showing of a wave-motion power generating system in accordance with the present invention in which the primary tower is located on the shore with an outlet to the sea.
Figure 2:
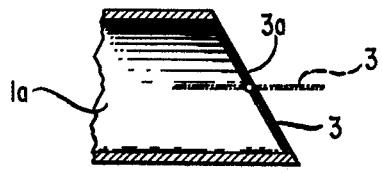
FIG. 2 is a sectional showing of the outlet valve of FIG. 1, through the plane indicated by the arrows 2—2 of FIG. 1.

Referring in detail to FIG. 1, there is shown a tower 1 of water impervious material, such as metal, ceramic, or rigid plastic, or any material not subject to corrosion by salt water and having sufficient strength and stability to withstand substantial wind stress. In the present example, the tower 1 is of general cylindrical form, of steel coated with tetrafluoroethylene, known by the trademark TEFLON, to protect from corrosion. It is 32 feet in overall height above the ground, 16 inches in inner diameter, and has a wall thickness of, say, one inch. In this embodiment, the lower end of the tower 1 is buried, say, about 10 feet below ground level, having an outlet pipe 1a, of the same diameter as the tower, which leads into the sea. The outlet 1a must, in any case, be completely below the mean low water level of the surrounding sea. The vent of pipe 1a is closed for the purpose of filling tower 1 by a valve 3, which may be of any of the types well-known in the art, either manually or automatically controlled, such as, for example, a simple butterfly valve. This comprises a flat, disk-shaped valve head 3a which is manually rotated by means of a crank-type handle about an axis 3b, so that the valve head 3a provides a water-tight seal inside of an annular flange 1c directed inwardly from the edge of the pipe 1a, which may include a conventional gasket to complete the seal.

Partway down from the top of the tower 1, and at least above the mean liquid level in the surrounding sea, is located a Venturi constriction 4. In the embodiment under description, the annular constriction 4 is, say, about 20 feet below the top of tower 1, and is 10 inches in inner diameter at the smallest cross-section, which extends about 4 inches in a vertical direction, widening out to full diameter above and below the constriction.

Mounted for rotation in the Venturi constriction 4 is a conventional turbine 5 of the propeller type, suitable for use with a low water head. This may, for example, be of the type shown in illustration 6, opposite page 581, Volume 22, Encyclopaedia Britannica, copyright 1954. In the present embodiment, turbine 5 is 9¾ inches in outer diameter, and 3 inches in depth, having just sufficient clearance to fit into the constriction 4. The vanes of turbine 5 are mounted at a pitch of, say, 45° tangential to a collar rigidly fixed to the shaft 6, and are so curved that the force of water falling vertically on the vanes has a substantial component in the direction of rotation in the horizontal plane.

Shaft 6, which is screwed or bolted to the center of turbine 5, is, say, 4 inches in cross-section and about 24 feet long, and is preferably of corrosion resistant steel. Shaft 6 is disposed along the axis of the upper end of tower 1, being supported for rotation in a central bearing mounted in the conventional spider 7 which is fastened to the inner walls of the tower. The upper end of the shaft 6 passes out through conventional hermetical sealing means 8, terminating at its upper end in driving relation to an alternating current electrical generator 9 which has electrical output terminals 10 and 11. The generator 9 is a conventional type of water-wheel-driven, alternating current generator, such as shown, for example, in FIG. 8, page 153, Volume 8, Encyclopaedia Britannica, copyright 1954. The windings of generator 9 are compensated to maintain the generator frequency constant, notwithstanding momentary over- or under-supplies of water.

In the present embodiment, the tower 1 is surrounded on the sea side by a large number, say, 24, of intake conduits 12, although it will be understood that the system is operative with any number of conduits arranged in any configuration, extending out from the primary tower 1, the amount of electricity generated being a function of the number of conduits and their arrangement. In the embodiment under description, these may be, for example, of polyvinyl chloride, 6 inches in outer diameter, and having a one-half inch wall thickness. It will be understood that conduits 12 can be of any convenient diameter, and of such wall thickness as to give them the required strength and flexibility. Any of numerous types of semirigid plastic materials will be suitable for this purpose, or flexible metal cable which is treated to resist corrosion by sea water. The length of conduits 12 must be sufficient to extend from an orifice located about one inch below the top of tower 1 to a depth which remains below the mean liquid level of the sea or other body of water surrounding tower 1. Each of conduits 12 is preferably anchored in place relative to the sea floor, so it is in a relatively fixed position.

Operation of the embodiment described with reference to FIG. 1 is as follows. As an initial step, with the valve 3 closed, the tower 1 is partially evacuated to a vacuum of, say, 30 inches of mercury, by connecting one of the conduits 12 to a conventional vacuum pump. The valve 3 is then opened, and the tower 1 is filled to a level supported by atmospheric pressure, roughly 32 feet, by water rushing in through the pipe 1a. This primes the system. A Toricelli vacuum develops in the small space between the upper surface of the liquid, and the top of the tower 1, having a depth of about 2 inches.

As waves above the mean liquid level of the surrounding body of water periodically pass over the inlets to each of the conduits 12, a positive pressure of $x+$ is built up therein, causing siphon action in which water passes through each of the respective conduits to the top of the tower. This causes increased pressure at the top of the tower, and the flow of water vertically downward in the tower 1, moving at an increased velocity through the Venturi constriction 4. The high velocity flow of water impinges on the vanes of the turbine 5, causing the turbine to rotate, driving the generator 9 to produce alternating current electricity of substantially uniform frequency across the terminals 10 and 11.

Figure 3:
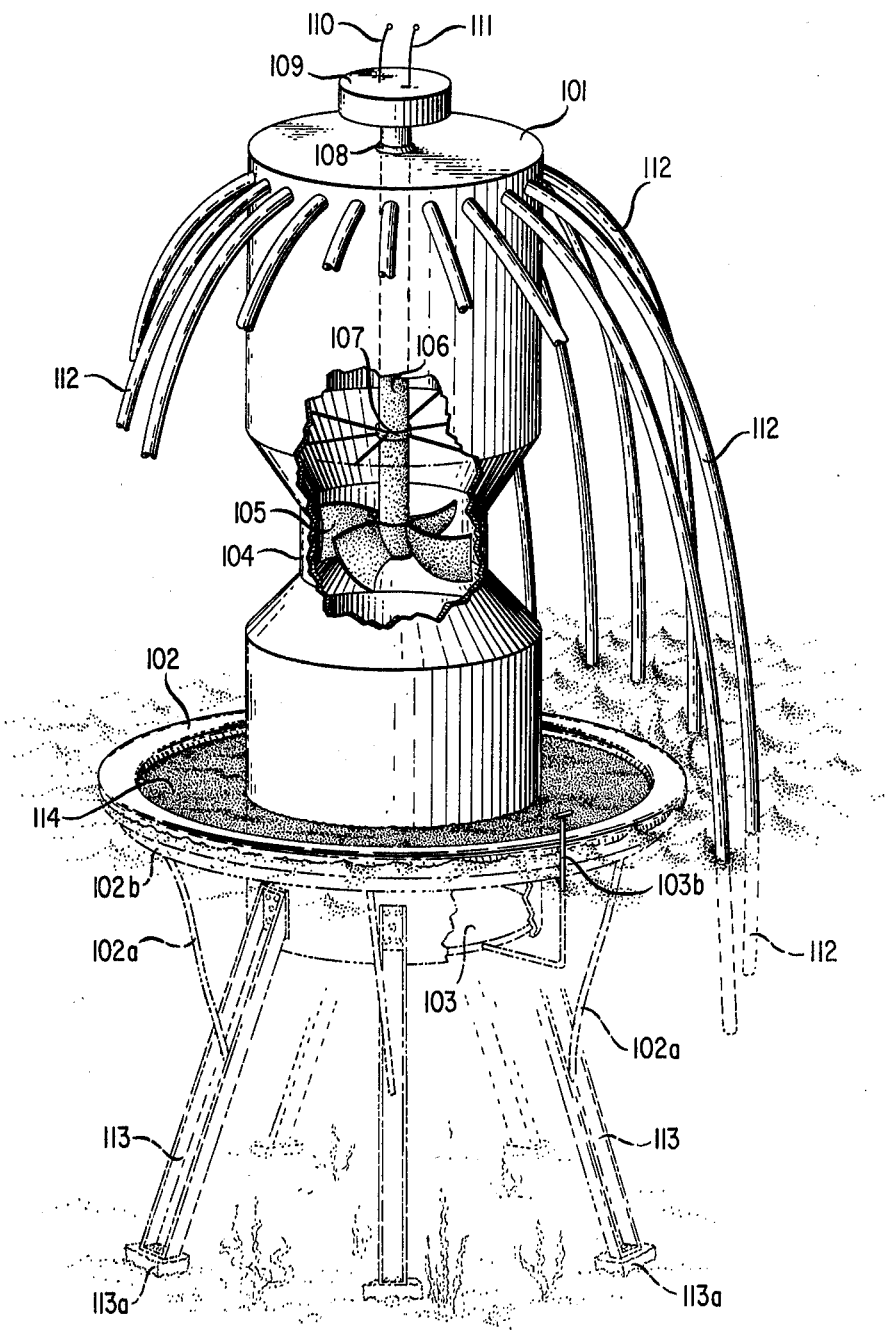
FIG. 3 is an alternative embodiment of the wave-motion power generating system of FIG. 1, in which the primary tower is supported on the sea bottom, and is surrounded by a flotation collar to limit the waves coming in contact with the tower.
Figure 4:
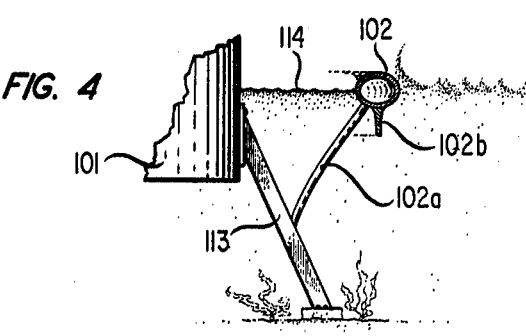
FIG. 4 is a detailed showing of a portion of the flotation collar and connection to one of the legs of FIG. 3.

FIG. 3 of the drawings shows a modified form of the invention in which the primary tower, instead of being on the shore as in FIG. 1, is surrounded on all sides by the sea. In the embodiment of FIG. 3, for simplicity of description, components corresponding to those described with reference to FIG. 1 will be designated by numbers to which 100 has been added. Thus, the primary tower 101 of FIG. 3 corresponds to tower 1 of FIG. 1, supply conduits 112 to conduits 12, etc.

The principal difference in the system of FIG. 3 is that the primary tower 101 is supported on the sea bed, in water which may be, for example, 100 feet deep, by means of supporting corrosion resistant metal legs 113 which are mounted in cement piles 113a, in a manner well-known in the art. The upper ends of the legs 113 are bolted or welded to symmetrically spaced positions around the lower periphery of tower 101, which is vertically disposed so that its lower end is well below the low water level of the surrounding sea. The bottom end of tower 101 is opened and closed by means of a butterfly valve 103, operated in the manner of the valve 3 of FIG. 1, although it will be understood that many other types of valves, either manually operated or remotely controlled, are suitable for this purpose. Valve 103 remains open except when the tower 101 is initially filled.

In the present illustrative embodiment, the tower 101 is surrounded by a circular flotation collar 102 which has an outer diameter of 45½ feet and an inner diameter of 33½ feet. This is held in place with reference to tower 101 by several symmetrically spaced flexible cables 102a which are connected at one end to the inner periphery of collar 102 and at the other end, partway down on a respective one of legs 113. As shown in FIG.

4 of the drawings, the flotation collar 102 has a downwardly depending cylindrical skirt 102b, about one-half inch thick, which extends below the mean liquid level, a vertical distance of about 12 feet in the present embodiment. Between flotation collar 102 and tower 101, a layer of oil 114 is applied, which may be, for example, crude oil designated as "Bunker C", in a layer, say 12 inches thick. This spreads out on the surface of the water between the flotation collar and the tower substantially eliminating wave motion in the area which would tend to cause variations in the water head of tower 101.

Figure 5:
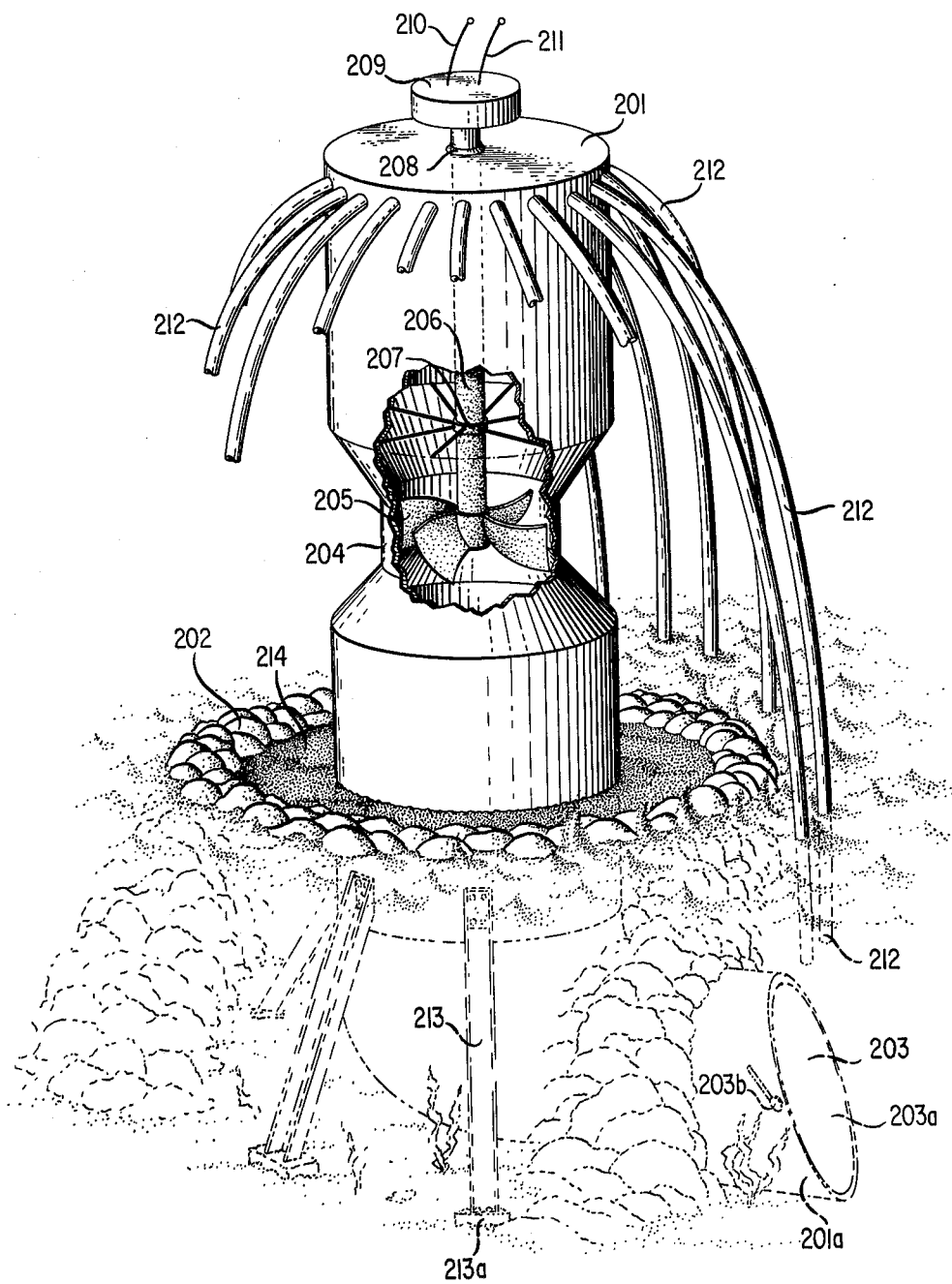
FIG. 5 is a modification of the embodiment of FIG. 3 in which a jetty is substituted for the flotation barrier.

It will be understood that other methods can be employed to isolate tower 101 from wave motion, such as by building a jetty 202 completely surrounding the tower, as shown in FIG. 5, in which elements similar to the system shown in FIG. 1 are indicated by designating numbers to which 200 has been added. Jetty 202 is either supported by legs 213, or separately supported from the sea floor, and having an inner diameter of, say, 33½ feet. A pipe 201a, as shown in FIG. 1, provides fluid communication between the tower and the sea outside of the jetty 202. It will be understood that in the embodiment of FIG. 5, as in the previous embodiment, a film of oil is preferably spread over the surface of the water inside the jetty 202 and adjacent the tower 201.

As contrasted with the system of FIG. 1, the tower 101 of FIG. 3, or tower 201 of FIG. 5, is surrounded on all sides by a series of conduits 112, or 212, respectively, which in the presently described embodiments may be 48 in number. It is contemplated that the conduits 112 or 212 will be of similar size and shape to conduits 12 described with reference to FIG. 1.

It will be apparent that the operation of the systems of FIG. 3 or FIG. 5 is substantially similar to that disclosed with reference to FIG. 1, except that it is possible to generate more power because of the larger number of possible supply conduits, and the much larger area over which they are distributed.

It will be understood that the present invention is not limited to the specific structural forms, materials or dimensions set forth herein by way of illustration, but only by the scope of the appended claims.

What is claimed is:

1. A system for generating power in response to wave motion in a large body of water which comprises in combination:
    a tower closed at the top and in fluid communication at the bottom with said body of water, means for forming a vacuum in said tower to thereby enclose a head of water supported by atmospheric pressure to a level substantially exceeding the mean water level of said body,
    at least one intake conduit connected to said tower having one orifice near the top of said tower, and a second orifice disposed below the mean liquid level of said large body of water,
    said tower having a Venturi constriction located on a plane partway between the base and the top of said tower,
    a turbine having its axis centered in said Venturi constriction and constructed to rotate a plurality of vanes in the principal plane thereof in response to the flow of water through said constriction, and
    a load coupled to be driven in energy transfer relationship by the rotation of said turbine.

2. The combination in accordance with claim 1 wherein said load comprises an electrical generator coupled to be driven in energy transfer relationship with said rotating turbine.

3. A system for generating power in response to wave motion in a large body of water which comprises in combination:
    a tower closed at the top and in fluid communication at the bottom with said body of water, said tower disposed to enclose a head of water supported by atmospheric pressure to a level substantially exceeding the mean water level of said body,
    a multiplicity of intake conduits connected to said tower each having one orifice near the top of said tower, and each having a second orifice disposed below the mean liquid level of said large body of water,
    said tower having a Venturi constriction located on a plane partway between the base and the top of said tower,
    a turbine having its axis centered in said Venturi constriction and constructed to rotate a plurality of vanes in the principal plane thereof in response to the flow of water through said constriction,
    a central shaft disposed axially in said tower and extending into said Venturi constriction, said turbine having its vanes rigidly connected to rotate said central shaft,
    an electrical generator,
    said shaft constructed to drive said generator for the conversion of mechanical energy to electrical energy, and
    terminals connected to said generator for deriving said electrical energy.

4. A system in accordance with claim 3 wherein said tower is land based,
    an outlet conduit connected between the lower end of said tower and disposed below the low liquid level of said large body of water, and
    valve means disposed in said outlet conduit which is constructed to close to fill said tower, and to be opened during normal operation of said tower.

5. A system in accordance with claim 1 wherein said tower is supported on the floor of said large body of water, the lower end of said tower extending below the low water level of said large body of water,
    valve means disposed in the lower end of said tower and constructed to close to fill said tower, and to remain open during normal operation of said tower.

6. A system in accordance with claim 5 wherein means is interposed between said tower and the second orifices of said intake conduits for isolating the water in said tower from the wave motion in said large body of water.

7. A system in accordance with claim 6 where said means for isolating said tower comprises a barrier means surrounding but spaced apart from said tower, anchored relative to said tower.

8. A system in accordance with claim 7 wherein oil is interposed between said tower and said barrier means for further isolating the water in said tower from wave motion.

9. A system in accordance with claim 7 wherein said barrier means takes the form of a flotation collar surrounding said tower and anchored in place with respect to said tower.

10. A system in accordance with claim 7 wherein said barrier means includes a jetty interposed between said tower and the second orifices of said intake conduits.

11. The method of generating power from the wave motion on an extended body of water which comprises the steps of:
   for initial priming, filling a tower, the upper and lower ends of which are closed during said priming operation, to a height supported by atmospheric pressure substantially above the mean liquid level of said body of water,
   subsequently opening the lower end of said tower for normal operation to provide fluid communication with said large body of water,
   progressively utilizing the fluid pressure generated by the passage of waves over a multiplicity of conduits each having its lower end disposed below the mean liquid level of said body to siphon water up through said conduits to the upper end of said tower around which said conduits are disposed in spaced apart relation,
   passing said water driven by the water pressure built up in the upper end of said tower down through a Venturi constriction to increase the speed of flow, and
   utilizing the increased flow of water to drive a turbine interposed in said Venturi constriction.

12. The method in accordance with claim 11 which comprises utilizing said turbine to drive an electrical generator.

13. The method in accordance with claim 12 which comprises isolating the water in said tower from the wave motion of said body of water by interposing barrier means between said tower and the intake ends of said conduits.

14. The combination in accordance with claim 12 which comprises spreading a layer of oil on the water between said tower and said barrier means.

* * * * *